United States Patent [19]
Stigall et al.

[11] 3,910,386
[45] Oct. 7, 1975

[54] QUICK INSTALLATION VEHICLE WHEEL SENSOR

[75] Inventors: Donald R. Stigall, Glendale; Richard C. Bueler, Des Peres, both of Mo.

[73] Assignee: Wagner Electric Corporation, Parsippany, N.J.

[22] Filed: Sept. 23, 1974

[21] Appl. No.: 508,244

[52] U.S. Cl.......... 188/181 R; 303/21 CF; 310/168
[51] Int. Cl.² .......................................... B60T 8/08
[58] Field of Search .................. 188/181 A, 181 R; 303/21 CF, 21 CG, 21 CE; 310/68 B, 68 E, 168; 324/167

[56] References Cited
UNITED STATES PATENTS
3,812,391  5/1974  Johnson et al. .................. 310/168

Primary Examiner—Duane A. Reger

[57] ABSTRACT

A vehicle wheel brake antilock assembly comprises a sensor. The sensor is mounted adjacent an end of an axle and provides first and second portions to generate a varying electrical signal and includes a stator and a rotor. The stator has a generally annular stator mounting ring carrying a first portion for generating the varying electrical signal. The rotor carries a second portion for generating the varying electrical signal. A retainer is mounted intermediate of the axle and the mounting ring for engaging and retaining the ring on the axle in a predetermined radial and axial orientation therewith. Resilient portions of the retainer are received by the ring and are axially flexed with respect to the axle during engagement and retention of the ring by the retainer.

6 Claims, 7 Drawing Figures

QUICK INSTALLATION VEHICLE WHEEL SENSOR

CROSS-REFERENCE TO RELATED APPLICATIONS

This invention relates generally to the sensor assembly disclosed in application Ser. No. 480,864 filed on June 19, 1974, a continuation of application Ser. No. 363,604 filed on May 24, 1973, now abandoned, by Donald R. Stigall and Richard C. Bueler entitled "Vehicle Wheel Speed Sensor" assigned to the assignee of the present invention, and also to the sensor assembly disclosed in application Ser. No. 470,947 filed on May 17, 1974 by Richard C. Bueler entitled "Antilock Sensor Assembly" assigned to the assignee of the present invention.

BACKGROUND OF THE INVENTION

1. Field Of The Invention

This invention relates generally to fluid pressure brake and analogous systems and more specifically to those of the inertia control type including brake system control by plural cooperating sensing means producing a single signal.

2. Description Of The Prior Art

In the past, there have been various types of electrical sensors for monitoring vehicle wheel speed in antilock brake systems to detect an incipient wheel-skid situation. For instance, U.S. Pat. No. 3,500,091 discloses a sensor which is mounted on the inboard side of a vehicle wheel, and the sensor includes an annular electrical coil positioned adjacent both an annular magnet and a pole piece which are arranged concentrically with each other. While this sensor has certain advantages, it is subjected to dirt, slush and other foreign particles which may be splashed or thrown thereon from the roadbed.

U.S. Pat. No. 3,473,120 discloses a sensor for a vehicle antilock brake system mounted in a wheel bearing lubrication chamber on the outboard side of the vehicle wheel, and the sensor rotor is mounted on the hub cap assembly while the sensor stator is housed generally within the bore of a hollow axle. While this sensor has certain advantages, the mounting of its stator within the hollow axle serves to either appreciably reduce the number of stator teeth or the size thereof, to either limit the number of flux paths or reduce the size of the cumulative flux paths, to reduce the strength of the output signal of the sensor, or to make the stator-rotor gap more critical. U.S. Pat. Nos. 2,798,976, 3,480,812 and 2,462,761 each show signal generating devices and illustrate various arrangments of the rotor and stator thereof.

More recently, it may be noted that there has been provided a sensor having a high signal output wherein the tolerance or gap between the sensor rotor and stator are not critical. Such sensors have magnet means mechanically maintained in intimate contact with the sensor pole pieces wherein the tolerance gap between the sensor stator and rotor, if small at one location while greater at another location, is averaged due to the use of plurality of individual flux paths which serve to minimize extraneous modulation. In such sensors the stator thereof has identical pole pieces and the component parts of the stator are all referenced and self-aligning. The sensor is operable in the environment of a lubricant for the vehicle wheel bearing and may be cooperably mounted on vehicle hub caps and on the bearing retaining nut which are staple articles with only a minimum of alteration thereof. Also, such sensors have a varying reluctance path providing means stamped from sheet metal and formed annularly wherein the thickness thereof is substantially constant.

In the above-described sensors there is no provision for quick installation on the assembly line. As a result, time-consuming electrical and mechanical connections are required during installation of the sensor.

SUMMARY OF THE INVENTION

Accordingly, the present invention provides a sensor for quick installation to accomplish required mechanical and electrical connections. The foregoing is accomplished by a vehicle wheel brake antilock logic assembly comprising a sensor. The sensor is mounted on an axle adjacent at least one of the vehicle wheels. The sensor has a rotor and a stator and includes a generally annular stator mounting ring carrying a first portion of a varying electrical signal generating means, including a coil, in cooperation with a second portion of the varying electrical signal generating means carried by the rotor. A retainer is generally mounted intermediate of the axle and the mounting ring and preferably is mounted on the end of the axle for engaging and retaining the ring on the axle in a predetermined radial and axial orientation therewith. Resilient portions of the retainer extend therefrom and are received by the ring so as to be axially flexed with respect to the axle for engaging and retaining the ring on the axle.

The above and further novel features of the invention will appear more fully from the following detailed description when read in connection with the accompanying drawings.

BRIEF DESCRIPTION OF THE DRAWINGS

In the drawings wherein like parts are designated alike.

DESCRIPTION OF THE PREFERRED EMBODIMENT

Figure 1:
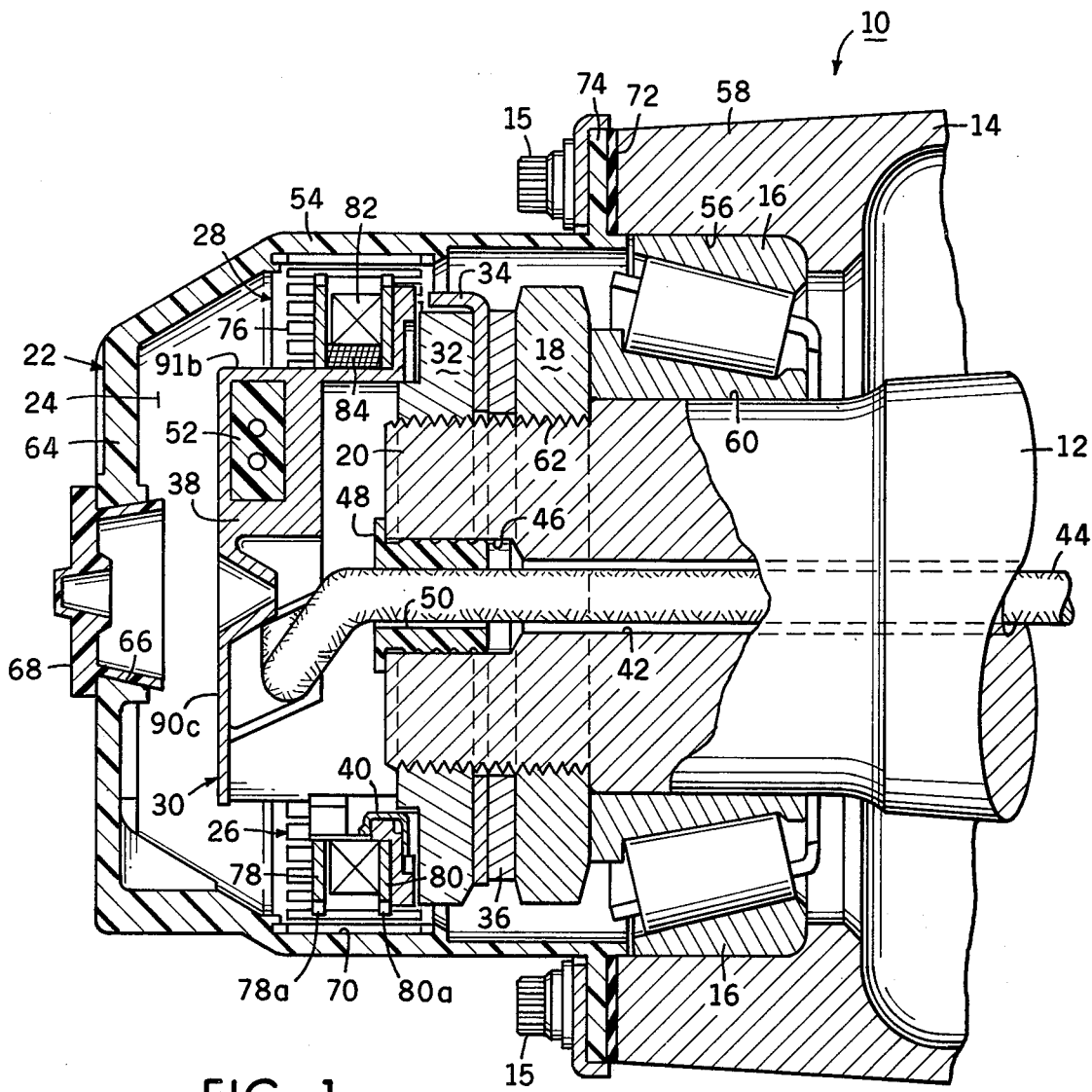
FIG. 1 is a partial side elevation of the antilock sensor assembly of this invention.

Referring now to the drawings, FIG. 1 illustrates the novel antilock sensor assembly of this invention generally designated 10. Generally cylindrical axle 12 has vehicle wheel 14 rotatably mounted thereon. Wheel bearing 16 is disposed between wheel 14 and axle 12, and wheel bearing retaining nut 18 is threadedly received on a free end portion 20 of the axle for retaining the bearing in place. Hub cap 22 is preferably engaged with wheel 14 by bolts 15 enclosing lubricating chamber 24 which holds lubricant for bearing 16. An electrical sensor is generally shown at 26 as a means for generating a varying electrical signal to control actuation of the logic portion of a vehicle antilock brake system or the like (not shown), and includes a rotor 28 which comprises hub cap 22 and associated component parts, as described hereinafter, and stator 30 adjacent end portion 20 which accommodates locknut 32, lockwasher 34, shim 36 and nut 18 which also retains in place bearing 16, as previously mentioned. Stator 30 has a generally annular stator mounting ring 38 carrying a first portion of the means generating the varying electrical signal. Rotor 28 carries a second portion of the means generating the signal. Also, the assembly includes a retainer 40 mounted intermediate of the axle free end 20 and ring 38 for engaging and retaining the ring on the axle in a predetermined radial and axial orientation therewith. A cylindrical bore 42 is provided in axle 12 to guide cable 44 from the logic system (not shown) to make electrical connection with sensor 26. Bore 42 terminates at free end 20 of axle 12 at receptacle 46 for accommodating grommet 48. The grommet includes opening 50 for further guiding and positioning of cable 44 with respect to its path from the logic system to the sensor. Cable 44 terminates adjacent sensor 26 at electrical connector 52 mounted on ring 38.

More particularly, a peripheral surface 60 of axle 12 is threaded at 62. Antifriction or wheel bearing 16, of a type well known in the art, is rotatably positioned in engagement between axle peripheral surface 60 and a cooperating annular surface 56 of wheel hub 58. Bearing retaining nut 18 is threadedly received on threaded portion 62 to maintain the bearing in place. Lockwasher 34 and locknut 32 maintain nut 18 in its assembled position on axle threads 62.

Hub cap 22, which is a type well known in the art and formed of either a nonferrous metal or a synthetic material, is generally cup-shaped having an annular sidewall 54 integratedly formed with base wall 64. A lubricant filler hole 66 is centrally provided in the basewall in which an insertable sealing plug 68 is received. Axially extending bore 70 is provided in hub cap sidewall 54 as discussed hereinafter. A gasket type seal 72 is positioned between hub cap flange 74 and wheel hub 58 to seal lubrication chamber 24.

Sensor 26 is provided with stator portion 30 comprising annular stator mounting ring 38 of nonferrous metal or other nonmagnetic or a synthetic material. Ring 38 is provided to carry a first portion of the means generating the varying electrical signal which comprises identical annular and generally planar pole pieces 78,80 which are stamped from flat steel stock and have a plurality of predeterminately circumferentially spaced teeth 78a, 80a, respectively, on the outer circumferential surface of pole pieces 78,80. The first portion also includes annular coil 82 interposed about ring 38 to space the pole pieces 78,80 and a plurality of permanent magnets 84 are disposed in generally circumferentially extending spaces provided on ring 38, the magnets being in end-to-end relationship. As is well known in the art, magnets 84 are disposed with all of their north and south poles, respectively adjacent to pole pieces 78,80 to provide like polarity therein.

Rotor 28 carries a second portion of the means generating the varying electrical signal and comprises hub cap 22, previously described, which carries ferrous ladder or track 76 stamped from substantially planar ferrous metal sheets. Ladder 76 is annularly mounted in bore 70 of hub cap 22 thus comprising the rotor portion 28 of sensor 26.

Figure 2:
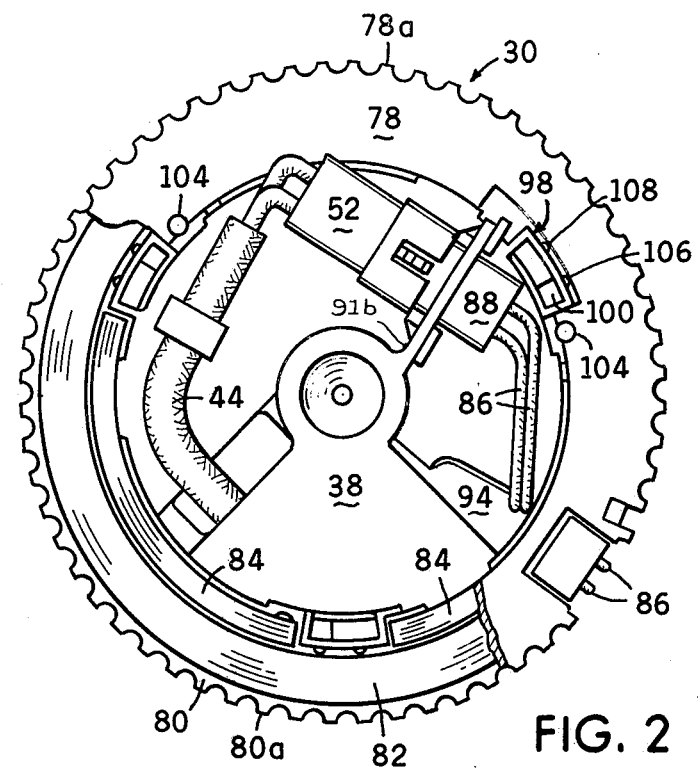
FIg. 2 is a plan view of a stator mounting ring carrying a signal generating portion.

In FIG. 2, stator 30 is shown including ring 38 carrying coil 82 and magnets 84 sandwiched between pole pieces 78,80 including teeth 78a, 80a, respectively. Also in FIG. 2, cable 44 is shown terminating at logic connector 52 for electrical connection to coil leads 86 via coil connector 88. The foregoing having generally described the interrelation of the elemental portions of this invention, the following will provide a more detailed description of those elemental portions.

Stator Mounting Ring

Figure 3:
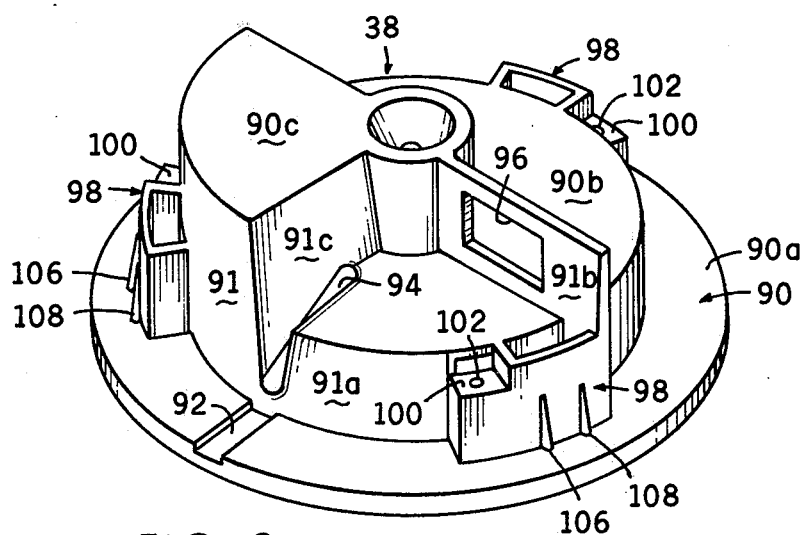
FIG. 3 is a perspective view of the ring.

Stator mounting ring 38, FIG. 3, is generally annular and is provided for mounting stator 30 on axle 12 and for carrying a first portion of a varying electrical signal generating means and is preferably cast from a suitable nonferrous alloy or other nonmagnetic alloy or a synthetic material. Ring 38 generally comprises a main radial portion 90 integratedly formed with main axially extending portion 91. Main radial portion 90 includes outboard radial portion 90a which extends radially outwardly from axial portion 91, and a first inboard radial portion 90b axially offset from and extending radially inwardly from main axial portion 91. Also, second inboard radial portion 90c is axially offset from both the outboard and the first radial inboard portions 90a, 90b, respectively. As a result, ring 38 has a generally stepped radial surface appearance due to the axially spaced radial portions 90a, 90b and 90c. Further included in ring 38 are channel 92 formed in outboard radial portion 90a and inclined groove 94 for guiding leads 86 from coil 82 to connector 88 as previously described.

First annular axial portion 91a spaces radial portion 90a from radial portion 90b. First transverse axially extending portion 91b intersects radial portion 90b and includes an opening 96 formed therein for accommodating electrical connectors 52, 88 as previously described (see also FIG. 2). Second transverse axially extending portion 91c spaces radial portion 90c from radial portion 90b for the purpose of offering a protective covering in the ring 38 to protect cable 44 (see also FIG. 1).

Integratedly formed with outboard radial portion 90a and annular axial portion 91a are a plurality of generally keystone shaped positioning or locating bosses 98, which are stepped to form locating surface 100 having openings 102 formed therein for receiving rivets or the like. In this manner, pole pieces 78,80 may be secured in position by rivets 104 as is best shown in FIG. 2. Referring further to FIG. 3, radially extending positioning or locating ribs or extensions 106,108 are provided on the axially extending peripheral surfaces of bosses 98. As described in the related disclosures, and as can be seen in FIGS. 2 and 3, magnets 84, coil 82 and pole pieces 78,80 are accommodated and carried by the ring 38 including bosses 98 and the radial and axial portions 90a,91a, respectively.

Figure 4:
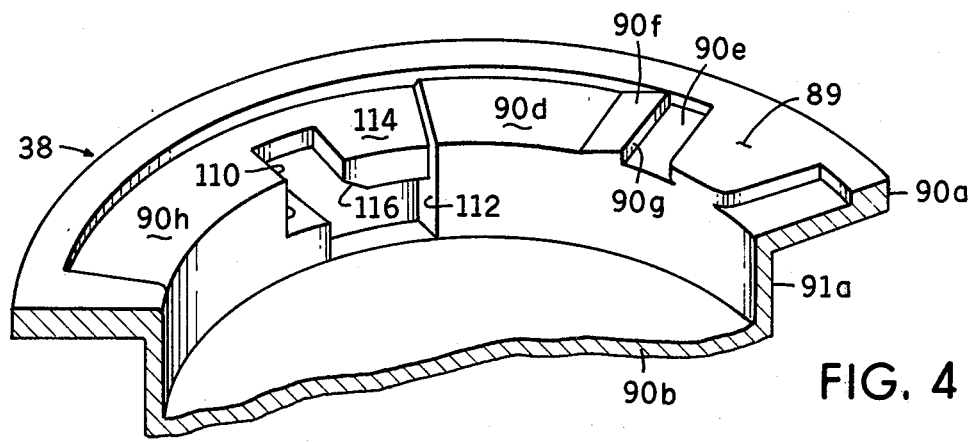
FIG. 4 is a partial perspective view of the stator mounting ring inverted from the view in FIG. 3.

FIG. 4, which is a partial perspective view of ring 38 inverted with respect to the view in FIG. 3, generally shows radial portions 90a and 90b axially spaced by axial portion 91a. Formed into the integratedly formed radial and axial portions 90a, 91a, respectively are means keyed for receiving, engaging and retaining ring 38 on retainer 40 in a predetermined radial and axial orientation with axle 12. More particularly, recessed portions 90d and 90e of main radial portion 90 are formed in keyed surface 89 of radial portion 90a and are separated by ramp or incline 90f which, when following a radial path of travel designated by the arrow R, inclines axially from recess 90d toward surface 89 and terminates abruptly at recess 90e to form axial ledge 90g. Recess 90h is also formed in surface 89 and includes opening 110. Axial portion 91a includes opening 112 integratedly formed with recess 90h to form radial land 114 including ramp or axial incline 116 which, when following radial path R, inclines axially opposite to incline 90f. The recesses and inclines mentioned above thus form keyed means for mounting ring 38 on axle 12.

Retainer

Figure 7:
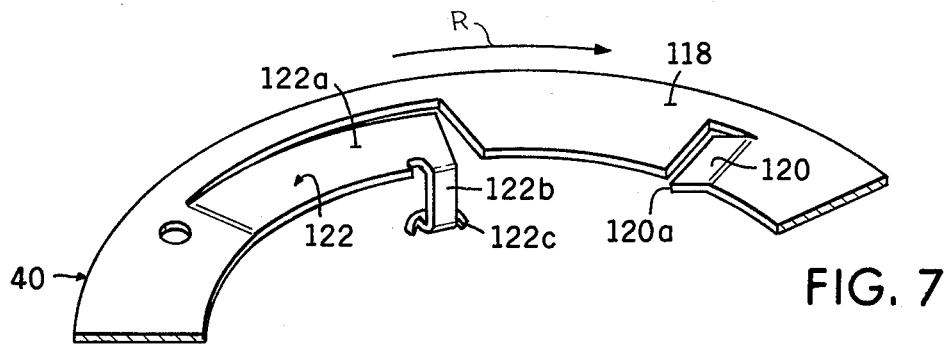
FIG. 7 is a partial perspective view of the retainer.
Figure 5:
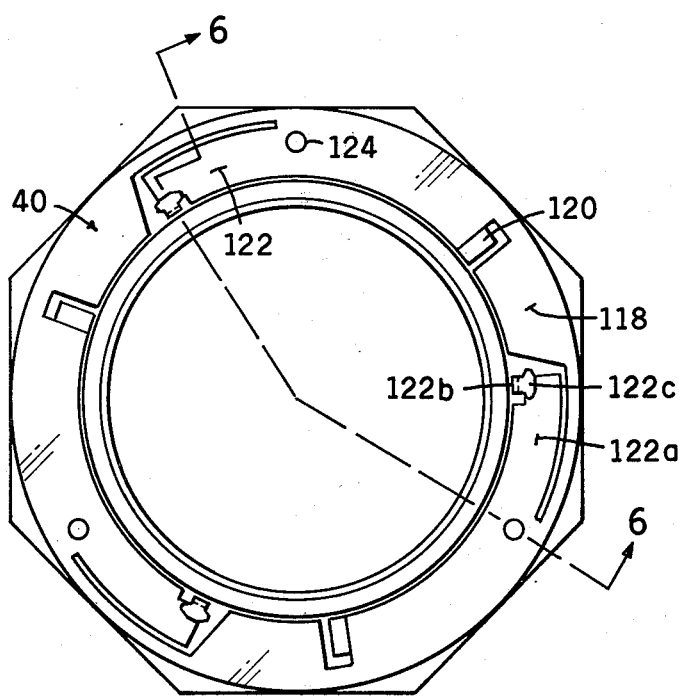
FIG. 5 is a plan view of a locknut carrying a retainer.
Figure 6:
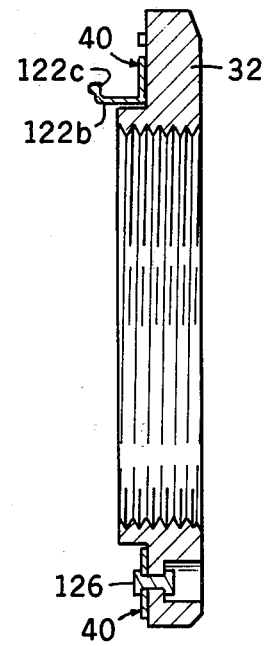
FIG. 6 is a side elevation of the locknut carrying the retainer.

Retainer 40 is illustrated in FIG. 5 as being generally annular comprising radial portion 118 preferably formed of spring steel such as by stamping. A plurality of first resilient portions 120 are integratedly formed therewith and axially displaced at an incline with respect to radial portion 118. Also, a plurality of second resilient portions 122 are integratedly formed therewith. First and second resilient portions 120, 122, respectively are capable of axial flexing or displacement relative to radial portion 118. Openings 124 are provided in radial portion 118 for accommodating rivets 126 or screws or the like for the attachment of retainer 40 to locknut 32 as shown in FIG. 6. In this manner, retainer 40 may be mounted on axle 12. In FIG. 7, first and second resilient portions 120,122, respectively, are further illustrated in perspective in their at rest positions to show axial flexure or displacement capabilities relative to radial portion 118. Second resilient portion 122 includes radial arm 122a and axial extension 122b having a nub 122c. Nub 122c and portion 120 are radially spaced along radial portion 118 for simultaneously engaging inclines 116 and 90f respectively. In this manner, first and second resilient portions 120,122 respectively, are keyed for engaging and retaining ring 38 on axle 12 when retainer 40 is mounted intermediate of the ring and the axle. Thus, with the first and second resilient portions, 120,122 respectively, at rest as shown in FIG. 7, it can be appreciated that axial flexure or displacement of first resilient member 120 from its at rest position axially toward radial portion 118 would require the application of a force, the removal of which would permit member 120 to tend to return to its natural or at rest position as shown. Similarly, axial flexure or displacement of second resilient member 122 from its at rest position axially away from radial portion 118 would require the application of a force, applied for example at nub 122c, the removal of such force permitting member 122 to tend to return to the natural or at rest position as shown. Due to the relative greater length of radial arm 122a as compared to member 120 as shown in the figures, it can further be appreciated that second resilient member 122 is substantially more flexible than first member 120 with respect to its potential displacement from radial portion 118.

Operation

When pre-assembled axle 12 moves along an assembly line having locknut 32 mounted thereon adjacent free end portion 20 and cable 44 and connector 52 protruding from axle 12, (see FIG. 1) an assemblyman has a pre-assembled stator comprising ring 38 having magnets 84 and coil 82 sandwiched between pole pieces 78,80 and leads 86 from coil 82 terminating at connector 88 mounted in transverse axial member 91b (see FIG. 2). Also, the assemblyman may have retainer 40 or the retainer may be pre-mounted by securing it to locknut 32 by rivets 126, or the like (see FIG. 6). When retainer 40 is in place mounted on locknut 32, it should become apparent from all the foregoing that the retainer provides a resilient means mounted on the axle, keyed as by first resilient portion 120 and second resilient portion 122, for engaging and retaining ring 38 on axle 12 in predetermined radial and axial orientation therewith.

Referring again to FIGS. 4 and 7, ring 38 includes means formed thereon for receiving the first and second resilient portions such as where recess 90d receives first resilient portion 120 and recess 90h receives second resilient portion 122, when retainer 40 and ring 38 are brought into proximity so that axial extension 122 is inserted into opening 110. When the assemblyman brings the ring and retainer into proximity as aforementioned and applies relative radial movement, such as movement along radial path designated R, FIG. 4, the following will result:

a. first resilient portion 120 will axially flex relative to and toward radial portion 118 as ramp 90f engages portion 120 to apply a force thereto until portion 120 clears ledge 90g and the force is removed thus permitting portion 120 to return to its at rest position extending axially away from radial portion 118 into recess 90e; and b. second portion 122 will axially flex relative to and away from radial portion 118 as ramp 116 engages nub 122c to apply a force thereto causing portion 122 to remain displaced from radial portion 118 at a distance substantially equivalent to the thickness of radial land 114: Thus it can be seen that any flexible members such as arm 122 in engagement with ramp 116 via nub 122c and portion 120 simultaneously in engagement with ramp 90f, when subjected to movement relative to ring 38 along path R, will axially flex or diverge from radial portion 118 of retainer 40.

Further relative radial movement between the ring and the retainer as described above is limited due to nub 122c engaging axial portion 91a in opening 112. In addition, engagement of nub 122c with land 114 permits but limits relative axial movement between ring 38 and retainer 40. Conversely, relative radial movement between the ring and retainer in a direction opposite to that described above is limited due to edge 120a of first resilient portion engaging ledge 90g. In this manner, the first resilient portion engages and retains the ring on the axle in a predetermined radial orientation and the second resilient portion engages and retains the ring on the axle in a predetermined axial and radial orientation therewith. Also, in this manner, ramps 90f and 116 axially flex the first and second portions 120, 122 respectively, with respect to the axle during engagement and retention of the ring by the retainer. Once ring 38 is firmly seated on axle 12 via retainer 40, electrical connection can be made between the logic system and the sensor by means of connectors 52 and 88 as shown best in FIG. 2.

When it is desired to remove ring 38 from axle 12, this may be accomplished by disconnecting electrical connectors 52 and 88 and then by axially displacing ring 38 from retainer 40 due to the axial flexibility of portion 122. Due to the length of arm 122a, second resilient portion 122 is substantially more flexible than first portion 120; i.e., second portion 122 can be displaced a greater distance from radial portion 118 than first portion 120. Removal is accomplished by merely pulling ring 38 axially away from retainer 40 which will displace the ring and retainer axially within the limits of axial retention due to nub 122c engaging ramp 116. When the displacement is sufficient to permit edge 120a of first portion 120 to clear ledge 90g, relative radial motion applied in a direction opposite to the motion described by the path designated R will result in radial displacement of the ring from the axle and disengagement of the first resilient portion 120 from its previously described radial orientation with the axle. Continued radial motion will move nub 122c along ramp 116 until extension 122b may be withdrawn from opening 110 for complete disengagement of ring 38 from retention to axle 12 via retainer 40.

In accordance with the foregoing, a method for mounting stator ring 38 on axle 12 includes mounting retainer 40 on end 20 of axle 12 for engaging and retaining stator 30 in a predetermined axial and radial orientation therewith. Then, the stator ring 38 of stator 30 may be mounted on retainer 40 for retaining stator 30 on axle 12.

The foregoing describes a sensor assembly provided for quick assembly on an axle and a method therefor, and for disassembly when required so that an effective electrical/mechanical connection is accomplished in a single assembly operation upon engaging the stator with the retainer.

Having thus described the invention in its best embodiment and mode of operation, that which is desired to be claimed by Letters Patent is:

1. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means in cooperation with a second portion of the varying electrical signal generating means carried by the rotor, the improvement comprising:
   retainer means mounted intermediate of the axle and the ring for engaging and retaining the ring on the axle in a predetermined radial and axial orientation therewith, the retainer including:
   a. first resilient means axially resilient with respect to the axle for engaging and retaining the ring on the axle in a predetermined radial orientation therewith; and
   b. second resilient means axially resilient with respect to the axle engaging and retaining the ring on the axle in a predetermined axial and radial orientation and for axially displacing the ring from the retainer for disengaging the first resilient means from a predetermined radial orientation with the axle.

2. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means carried by the rotor, the improvement comprising:
   1. retainer means for fixed attachment to the axle;
   2. a plurality of members connected to the retainer means axially flexible with respect to the axle; and
   3. sensor carrying means keyed to rotatably receive the flexible members for attaching and detaching relationship between the sensor carrying means and the axle.

3. In a vehicle wheel antilock system of the type including a wheel speed sensor, the sensor mounted on an axle adjacent at least one of the vehicle wheels, the sensor having a rotor and a stator and including a generally annular stator mounting ring carrying a first portion of a varying electrical signal generating means in cooperation with a second portion of the varying electrical signal generating means carried by the rotor, the improvement comprising:
   a. means formed on the ring keyed for mounting the ring on the axle in a predetermined radial and axial orientation with the axle; and
   b. retainer means mounted on the axle keyed for receiving the ring, and further including:
      1. first resilient means axially resilient with respect to the axle for engaging and retaining the ring on the axle in a predetermined radial orientation therewith; and
      2. second resilient means axially resilient with respect to the axle for engaging and retaining the axle in a predetermined axial and radial orientation and for axially displacing the ring from the retainer means for disengaging the first resilient means from predetermined radial orientation with the axle.

4. A vehicle wheel brake antilock assembly comprising:
   1. generally annular stator mounting ring means for mounting the stator on an axle;
   2. retainer means mounted intemediate of the axle and the ring for engaging and retaining the ring on the axle in a predetermined radial and axial orientation therewith, the retainer including:
      a. first resilient means axially resilient with respect to the axle for engaging and retaining the ring on the axle in a predetermined radial orientation therewith; and
      b. second resilient means axially resilient with respect to the axle for engaging and retaining the ring on the axle in a predetermined axial and radial orientation therewith; and
   3. means formed on the ring for receiving the first and second resilient means and for axially flexing the first and second means with respect to the axle during engagement and retention of the ring by the retainer.

5. A vehicle wheel brake antilock assembly comprising:
   1. generally annular stator mounting ring means for mounting the stator on an axle; and
   2. retainer means mounted intermediate of the axle and the ring for engaging and retaining the ring on the axle in a predetermined radial and axial orientation therewith, the retainer including:
      a. first resilient means axially resilient with respect to the axle for engaging and retaining the ring on the axle in a predetermined radial orientation therewith; and
      b. second resilient means axially resilient with respect to the axle for engaging and retaining the ring on the axle in a predetermined axial and radial orientation therewith and for axially displacing the ring from the retainer for disengaging the first resilient means from predetermined radial orientation with the axle.

6. A vehicle wheel brake antilock assembly comprising:
1. generally annular stator mounting ring means for mounting the stator on an axle;
2. retainer means mounted intermediate of the axle and the ring for engaging and retaining the ring on the axle in a predetermined radial and axial orientation therewith, the retainer including:
   a. first resilient means axially resilient with respect to the axle for engaging and retaining the ring on the axle in a predetermined radial orientation therewith; and
   b. second resilient means axially resilient with respect to the axle for engaging and retaining the ring on the axle in a predetermined axial and radial orientation therewith and for axially displacing the ring from the retainer for disengaging the first resilient means from predetermined radial orientation with the axle; and
3. means formed on the ring for receiving the second resilient means and for axially flexing the second means with respect to the axle during engagement and retention of the ring by the retainer and for axially flexing the second means with respect to the axle during disengagement of the first resilient means from predetermined radial orientation with the axle.

* * * * *